United States Patent
Matsutani

(10) Patent No.: US 12,036,083 B2
(45) Date of Patent: Jul. 16, 2024

(54) DENTAL HANDPIECE SYSTEM

(71) Applicant: MANI, INC., Utsunomiya (JP)

(72) Inventor: Kazuhiko Matsutani, Utsunomiya (JP)

(73) Assignee: Mani, Inc. (JP)

( * ) Notice: Subject to any disclaimer, the term of this patent is extended or adjusted under 35 U.S.C. 154(b) by 155 days.

(21) Appl. No.: 17/325,079

(22) Filed: May 19, 2021

(65) Prior Publication Data

US 2021/0401542 A1 Dec. 30, 2021

(30) Foreign Application Priority Data

Jun. 26, 2020 (JP) ................................. 2020-110386

(51) Int. Cl.
*A61C 5/44* (2017.01)
*A61C 5/42* (2017.01)

(52) U.S. Cl.
CPC ................. *A61C 5/44* (2017.02); *A61C 5/42* (2017.02)

(58) Field of Classification Search
CPC ............. A61C 5/40–44; A61C 19/042; A61C 19/041; A61C 1/0007; A61C 1/0015; A61C 1/003; A61C 1/082; A61C 1/084; A61C 1/085; A61C 1/10; A61C 1/12; A61C 1/18; A61C 1/188; A61C 8/0089; A61C 17/221; A61C 19/043
See application file for complete search history.

(56) References Cited

U.S. PATENT DOCUMENTS

| | | | |
|---|---|---|---|
| 6,171,108 B1 * | 1/2001 | Roane | A61C 1/141 433/102 |
| 8,192,200 B1 | 6/2012 | Heath et al. | |
| 2002/0018979 A1 | 2/2002 | Matsutani et al. | |
| 2004/0219482 A1 | 11/2004 | Bina et al. | |

(Continued)

FOREIGN PATENT DOCUMENTS

| | | |
|---|---|---|
| JP | 2002035010 A | 2/2002 |
| JP | 4773860 | 9/2011 |

(Continued)

OTHER PUBLICATIONS

First Office Action mailed Oct. 25, 2022, issued in corresponding Chinese Application No. 202110642230.8, filed Jun. 9, 2021, 9 pages.

(Continued)

*Primary Examiner* — Edward Moran
(74) *Attorney, Agent, or Firm* — Christensen O'Connor Johnson Kindness PLLC

(57) ABSTRACT

The purpose of the present invention is to enable safer treatment and to reduce variation of treatment effects in root canal treatment using a dental handpiece, regardless of operator's skill level. The present invention is a dental handpiece system including a handpiece and a rod-shaped cutting tool, in which the handpiece includes a handpiece body and a head part provided at a tip of the handpiece body, the rod-shaped cutting tool is rotatably attached to the head part of the handpiece and is used to cut a root canal, and the dental handpiece system detects at least one selected from (Continued)

the group consisting of a force applied to the handpiece from an external matter in an axial direction of the cutting tool and an acceleration of the handpiece in the axial direction of the cutting tool when cutting the root canal.

5 Claims, 10 Drawing Sheets

(56) References Cited

U.S. PATENT DOCUMENTS

| | | | |
|---|---|---|---|
| 2012/0315598 A1* | 12/2012 | Kim | A61C 1/12 433/132 |
| 2015/0374458 A1 | 12/2015 | Yared | |
| 2018/0132972 A1 | 5/2018 | Mohammad | |
| 2019/0183605 A1 | 6/2019 | Motoyama et al. | |
| 2019/0254774 A1 | 8/2019 | Nakai | |

FOREIGN PATENT DOCUMENTS

| | | |
|---|---|---|
| JP | 5785790 | 3/2015 |
| JP | 2019111045 A | 7/2019 |
| WO | 2011/030906 A1 | 3/2011 |
| WO | 2018061412 A1 | 4/2018 |
| WO | 2018194909 A1 | 10/2018 |

OTHER PUBLICATIONS

Indian Office Action as mailed on Jan. 25, 2023, issued in corresponding Indian Patent Application No. 202245049585, 6 pages.
Examination Report issued Mar. 7, 2022 in corresponding Indian Application No. 202144023125, filed May 24, 2021, 6 pages.
DE Office Action dated Dec. 11, 2023 for DE App. No. 10 2021 116 193.2, 14 pages.

* cited by examiner

DENTAL HANDPIECE SYSTEM

TECHNICAL FIELD

The present invention relates to a dental handpiece system.

BACKGROUND ART

Generally, a cutting tool with a spiral cutting edge at a tip of the tool is used to treat root canals of teeth. The cutting edge of the cutting tool is inserted into the root canal, and the root canal is cut by pushing and pulling cutting, rotary cutting, or a combination of the two, like a file.

There are two ways to cut the root canals by a dentist or other operator holding a handle of a cutting tool: one of which to manually cut the root canal with a hand cutting tool; and the other to cut the root canal with an engine cutting tool connected with a dental handpiece which is driven by rotational driving force generated by an electric motor or the like.

When cutting an inner root canal wall along the root canal, a propulsive force (the force with which the cutting tool advances by itself) caused by a cutting force of the cutting tool (cutting edge thereof) is used. In root canal treatment with a dental handpiece, the propulsive force of the cutting tool is increased by momentum of the rotational driving force generated by the electric motor or the like, so the cutting edge may bite into the root canal wall and be pulled further and further toward a root apex. In such a case, there is a risk that the cutting edge may bite into the root canal wall more than necessary and lock or break the cutting tool or penetrate an apical foramen. Therefore, various dental handpieces and their systems have been studied to avoid the risk of biting or root apex penetration of the cutting tool.

For example, JP2002-35010A proposes a dental handpiece having a means for holding a cutting tool for a tooth to be treated and a support for setting the cutting tool at a desired position relative to the tooth to be treated. With this dental handpiece, a root canal can be formed stably by the cutting tool, and the risk that the cutting tool penetrates an apical foramen can be easily avoided.

In addition, JP2019-111045A proposes a root canal treatment device equipped with a root canal treatment support device and a handpiece, in which the root canal treatment support device provides information that can be used for root canal treatment, and the handpiece holds a cutting tool drivably in a head part thereof. The root canal treatment support device has a receiving unit that receives image information of a root canal of a tooth, an information generation unit that generates information related to root canal treatment according to root canal shape based on the image information received by the receiving unit, and an output unit that outputs the information generated by the information generation unit. The root canal treatment device equipped with the root canal treatment support device can output information related to root canal treatment according to classification of the root canal shape and can appropriately support the root canal treatment by surgeons.

SUMMARY OF INVENTION

Technical Problem

In the dental handpiece disclosed in JP2002-35010A and the root canal treatment device disclosed in JP2019-111045A, information related to the rotation of a cutting tool, such as the amount of drive current, amount of torque, rotation angle, rotation speed, and rotation angular speed (number of rotations) of an electric motor that rotates the cutting tool, is detected to control the drive to rotate the cutting tool according to the detected information.

Therefore, when a cutting edge of the cutting tool bites into a root canal wall and is pulled in the direction of a root apex, the risk of biting or root apex penetration of the cutting tool can be avoided.

However, when using the dental handpiece disclosed in JP2002-35010A and the root canal treatment device disclosed in JP2019-111045A, the operator has to pull up the cutting tool repeatedly at the moment when the cutting edge of the cutting tool slightly bites into the root canal wall in order to prevent the cutting edge from biting into the root canal wall and being pulled toward the root apex during the root canal treatment, as a precondition for avoiding the aforementioned risk. In order to perform such instantaneous pull-up motion, a highly skilled pull-up technique is required.

In view of safety reasons, operators with a lower skill level for root canal treatment (hereinafter referred to as "low-skilled operators") could not easily switch from a manual method for using a hand cutting tool to a method for using a dental handpiece connected to an engine. Another problem is a variation in the effectiveness of the treatment depending on operator's skill level.

In light of such situations, the purpose of the present invention is to enable safer treatment and to reduce variation of treatment effects in root canal treatment using a dental handpiece, regardless of the operator's skill level.

Solution to Problem

To achieve the above purpose, in this disclosed technology, the concept of conventional dental handpieces to detect information related to rotation of the cutting tool, is changed to a concept of a dental handpiece to detect a force transmitted to an operator's hand holding a handpiece (a sensation (tactile sense) in the operator's hand holding the handpiece).

Specifically, a dental handpiece system disclosed herein includes a handpiece and a rod-shaped cutting tool, in which the handpiece includes a handpiece body and a head part provided at a tip of the handpiece body, the rod-shaped cutting tool is rotatably attached to the head part of the handpiece and is used to cut a root canal of a tooth.

The dental handpiece system detects at least one selected from the group consisting of a force applied to the handpiece from an external matter in an axial direction of the cutting tool and an acceleration of the handpiece in the axial direction of the cutting tool when cutting the root canal.

According to the aforementioned configuration, when cutting the root canal, at least one selected from the group consisting of the force applied to the handpiece from the external matter in the axial direction of the cutting tool (hereinafter referred to as "external force") and the acceleration of the handpiece in the axial direction of the cutting tool (hereinafter referred to simply as "acceleration") is detected (hereinafter at least one selected from the group consisting of the external force and the acceleration is also referred to as "tactile sense information"). In other words, the tactile sense information that can actually be felt by the operator's hand is detected. By using the detected tactile sense information, it will allow for even safer root canal treatment and less variation in treatment effects using the dental handpiece in the root canal treatment, regardless of operator's skill level.

The handpiece further includes an adjustment mechanism capable of adjusting a distance between the handpiece and a tooth to be treated. The adjustment mechanism may adjust the distance between the handpiece and the tooth to be treated according to at least one selected from the group consisting of the force applied to the handpiece from the external matter and the acceleration of the handpiece when cutting the root canal.

According to the aforementioned configuration, the manner in which the detected tactile information is used is embodied. Specifically, when cutting the root canal, the adjustment mechanism adjusts the distance between the handpiece and the tooth to be treated according to the tactile sense information. This allows the adjustment mechanism to, for example, pull up the handpiece instead of the operator's hands (support the operator's hand movement) when the handpiece is lightly pulled in. Thus, the above-mentioned effect can be improved.

The adjustment mechanism may detect the force applied to the handpiece from the external matter.

According to the aforementioned configuration, the configuration of the dental handpiece is simplified since neither various sensor for detecting external force nor sensor circuit therefor is necessary, resulting that its cost can be reduced.

At least part of the adjustment mechanism may be configured to contact with the tooth to be treated.

According to the aforementioned configuration, a structure of the adjustment mechanism is embodied. Specifically, since at least part of the adjustment mechanism is configured to contact with the tooth to be treated, the force (reaction force) received from the tooth can be detected at a contacting portion. Therefore, since the external force can be directly detected as the reaction force applied to the adjustment mechanism from the tooth, a detection accuracy of the external force and a response speed of the adjustment mechanism can be improved.

The dental handpiece system may further include an elastic stopper being externally and movably mounted on the cutting tool in the axial direction of the cutting tool, in which at least part of the adjustment mechanism may be configured to contact with the tooth to be treated via the stopper, and the adjustment mechanism may adjust the distance between the handpiece and the tooth to be treated, by moving the stopper in the axial direction of the cutting tool.

According to the aforementioned configuration, the stopper, the shape of which naturally returns to its original shape by its own elasticity when the cutting tool is pulled in, is interposed between the tooth and the adjustment mechanism in contact with the tooth, resulting that the movement of the operator's hand can be further supported.

The dental handpiece system may further include an imparting means for imparting a rotational driving force to the cutting tool, in which the rotational drive force may be adjusted according to at least one selected from the group consisting of the force applied to the handpiece from the external matter and the acceleration of the handpiece, when cutting the root canal.

According to the aforementioned configuration, the rotational driving force of the cutting tool is adjusted according to the tactile sense information, thus reducing the risk of biting or root apex penetration of the cutting tool.

The rotational driving force may be linked to the distance between the handpiece and the tooth to be treated.

According to the aforementioned configuration, the distance between the handpiece and the tooth to be treated can be extended while or after reducing the rotational driving force of the cutting tool when the adjustment mechanism detects the tactile sense information. Therefore, the above-mentioned effect can be further improved.

The dental handpiece system may further include a storage means and a control means for controlling at least one of the adjustment mechanism and the imparting means, in which the storage means may prestore one or more optimal values of at least one selected from the group consisting of the force applied to the handpiece from the external matter, the acceleration of the handpiece, the distance between the handpiece and the tooth to be treated, and the rotational driving force, according to a desired movement of the handpiece by operators with a higher skill level for root canal (relatively higher skill in root canal treatment) than the low-skilled operators (hereinafter referred to as "high-skilled operator"), and the control means may continuously control at least one of the adjustment mechanism and the imparting means so that at least one selected from the group consisting of the force applied to the handpiece from the external matter, the acceleration of the handpiece, the distance between the handpiece and the tooth to be treated and the rotational driving force is optimized based on the one or more optimum values read from the storage means, to support the movement of the handpiece.

According to the aforementioned configuration, the control means controls the distance between the handpiece and the tooth to be treated and/or the rotational driving force of the cutting tool in accordance with various information read from the storage means to achieve the desired movement of the handpiece by the high-skilled operator. Thus, the aforementioned effect can be further improved. In other words, the movement of the high-skilled operator's hand can be reproduced. In addition, it is possible to automate the movement of the handpiece that reproduces the movement of the high-skilled operator's hand. Furthermore, real-haptics technologies can be used.

In addition, a stopper member used in the dental handpiece system described above is included in the present disclosure. Specifically, the stopper member disclosed herein is used in the dental handpiece system including the handpiece and the rod-shaped cutting tool, in which the handpiece includes the handpiece body and the head part provided at the tip of the handpiece body,
the rod-shaped cutting tool is rotatably attached to the head part of the handpiece and is used to cut the root canal, and
the stopper member is placed between a tooth to be treated and the head part.

The stopper member is elastic.

A length of the cutting tool in the axial direction thereof can be adjusted in the placement of the cutting tool.

According to the aforementioned configuration, the stopper member is elastic and can be used in the dental handpiece system to adjust the length of the cutting tool in the axial direction thereof in the placement of the cutting tool between the tooth to be treated and the head part.

The length of the cutting tool in the axial direction thereof may be adjusted according to a displacement of the stopper member. The dental handpiece system may have at least one stopper member. The at least one stopper member may have two or more stopper members. The length of the cutting tool in the axial direction thereof may be adjusted by stacking the stopper members to each other in the axial direction of the cutting tool.

According to the aforementioned configuration, the stopper member, the length of which is adjusted in the axial direction of the cutting tool, is embodied.

Advantageous Effect of the Invention

As explained above, the present disclosure allows for safer treatment and less variation in treatment effects using the dental handpiece in the root canal treatment, regardless of the operator's skill level.

DESCRIPTION OF EMBODIMENTS

Embodiments of the present disclosure will be described in detail based on the drawings. The following description of preferred embodiments is illustrative in nature only and the invention, its applications, or uses therefor is not intended to limit thereto in any way.

First Embodiment

Figure 1:
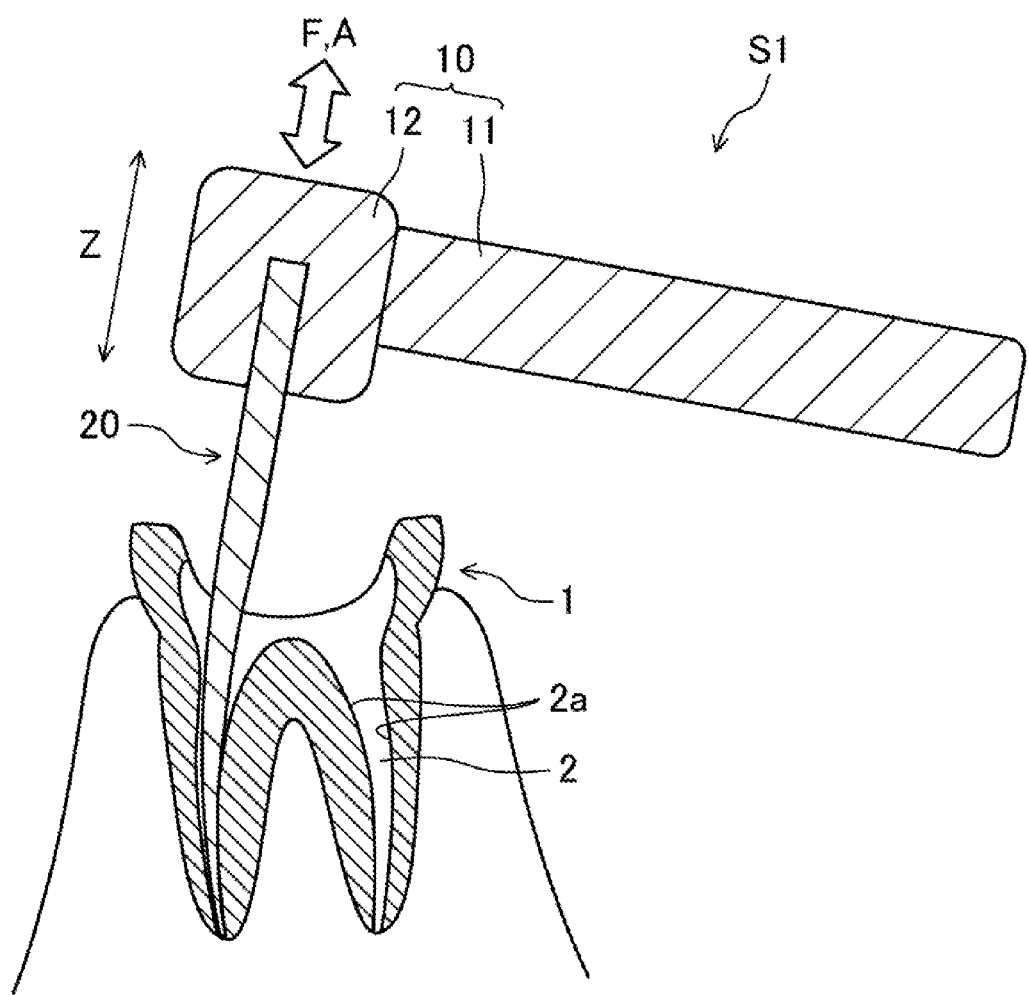
FIG. 1 shows a schematic cross-sectional view of a state where a root canal is cut using a dental handpiece system according to the first embodiment.

FIG. 1 shows a dental handpiece system S1 according to the first embodiment of the present disclosure. The dental handpiece system S1 includes a handpiece 10 and a cutting tool 20 that is held by the handpiece 10.
Handpiece The handpiece 10 is a rotary tool that connects a cutting tool 20 and rotates the connected cutting tool 20. The handpiece 10 has a handpiece body 11 and a head part 12 that is continuously connected to a tip of the handpiece body 11.

The handpiece body 11 is for being grasped by operator's fingers. Inside the handpiece body 11 (handpiece 10), there is an electric motor 14 (see FIG. 7) as a imparting means of imparting a rotational driving force to the cutting tool 20, a motor drive circuit 51 (see FIG. 7) for driving the electric motor 14, and a sensor circuit 52 (see FIG. 7) for driving various sensors 13 described below.

A root canal length measurement circuit 53 (see FIG. 7) may be provided in the handpiece body 11 to detect the position of the tip of the cutting tool 20 in a root canal 2. This can reduce the risk of root apex penetration and the like. The root canal length measurement circuit 53 is configured as a closed circuit with the cutting tool 20 inserted into the root canal 2 as one electrode and an oral electrode 54 (see FIG. 7) attached to a patient's lip as the other electrode. By measuring impedance between the cutting tool 20 and the oral electrode 54, a distance from root apex position of a tooth 1 to the tip of the cutting tool 20 can be measured.

The head part 12 holds the cutting tool 20 detachably and rotatably around its central axis. A facing side of the head part 12 facing the tooth 1 during root canal treatment has an insertion hole for the cutting tool 20. Various sensors 13 (see FIG. 7) such as load sensors (e.g., load cells), pressure sensors, and inertial sensors (acceleration sensors) are provided in the head part 12.

The electronic components such as the various sensors 13 and electric motor 14 are not limited to any particular electronic component, and commercially available electronic components can be used. The oral electrodes 54 are not limited to any particular electrode, and commercially available electrodes can be used. The various circuits 51, 52 and 53 are not limited to any particular circuit, and any known circuit can be used. The various circuits 51, 52 and 53 may be located in the head part 12, or in the electronic device 50 (see FIG. 8) described below, instead of the handpiece body 11.

The handpiece 10 (handpiece body 11) may have a display means 55 (see FIG. 7) that indicates, for example, a mark that resembles a human face, text and light when the risk of biting, root apex penetration or the like of the cutting tool 20 increases during the root canal treatment.
Cutting Tool The cutting tool 20 is used to cut the root canal 2 in dental treatment, and has a rod shape. The tip (one end in the axial direction) of the cutting tool 20 has a blade part such as a cutting edge and edge, corresponding to the purpose of the treatment. On the other hand, a base portion (other end in the axial direction) of the cutting tool 20 has a holding part that is rotatably held in the head part 12 (the insertion hole described above) of the handpiece 10.

As shown in FIG. 1, in the root canal treatment, an inner wall of the root canal 2 is cut by inserting the blade part (cutting edge) of the cutting tool 20 into the root canal 2 of the tooth 1 to be treated, and then rotating it in the direction of the cutting edge (rotary cutting), moving it in the axial direction Z of the cutting tool 20 (push-pull cutting), or rotating and moving it in the axial direction Z (a combination of the rotary cutting and the push-pull cutting), resulting that the root canal 2 is formed. Cutting the root canal 2 means that the cutting edge of the cutting tool 20 bites into a root canal wall 2a to some extent and file it.

The cutting tools 20 include engine reamers, files (e.g., K-files, H-files, O-files and flare files), peaso reamers, Gates drills and the lile.

For example, the engine reamer is mainly used for the rotary cutting because the pitch of the spiral is large and loose. On the other hand, the file has a smaller pitch than the pitch of the reamer, so it is mainly used for the push-pull cutting like the file. The file is often rotated slightly at the same time as it is pushed and pulled, so cutting debris can be scraped out of the root canal 2 by spiral grooves of the cutting edge at the same time as it is cut by the pulling action.

Detection of Tactile Sense Information

The dental handpiece system S1 is configured to detect a force (external force) F applied to handpiece 10 from an external matter in the axial direction Z of the cutting tool 20 and an acceleration A of the handpiece 10 in the axial direction Z of the cutting tool 20 when cutting the root canal 2, as tactile sense information.

In the present description, the axial direction Z of the cutting tool 20 refers to the direction that is approximately the same as the axial direction Z of the cutting tool 20, including a direction along the shape of the root canal 2 (root apex direction), a circumferential direction near a contact point of a circle or curve on a straight line along the axial direction Z of the cutting tool 20, and a direction of the push-pull motion of the handpiece 10 by the operator.

The external force F and acceleration A are generated, for example, at the moment when the cutting tool 20 slightly bites into the root canal wall 2*a*, or at the time when the cutting tool 20 bites into the root canal wall 2*a* and is pulled further and further toward the root apex, and are transmitted to the operator's hand holding the handpiece 10 when cutting the root canal 2. Thus, what the operator actually feels in the operator's hand is not information related to rotation such as the torque of the cutting tool 20, but the force and/or acceleration acting in the direction of the handpiece 10 approaching the tooth 1 or of the handpiece 10 being pulled away from the tooth 1 (i.e., in approximately the same direction as the axial direction Z of the cutting tool 20).

The external force F and acceleration A include, for example, a force and acceleration acting in the direction of the handpiece 10 approaching the tooth 1, which are caused as the cutting tool 20 itself moves along the shape of the root canal 2 by a cutting force of the cutting tool 20;

a relatively strong force and acceleration acting in the direction of the handpiece 10 approaching the tooth 1, which are caused at the moment when the cutting tool 20 slightly bites into the root canal wall 2*a*, or at the time when the cutting tool 20 bites into the root canal wall 2*a* and is pulled further and further toward the root apex;

a relatively strong force and acceleration acting in the direction of the handpiece 10 being pulled away from the tooth 1, which are caused when the operator performs a pull-up motion to avoid the risk of biting, root apex penetration or the like of the cutting tool 20;

a relatively weak force and acceleration acting in the direction of the handpiece 10 being pulled away from the tooth 1, which are generated when the bite of the cutting tool 20 is avoided;

other forces and accelerations received from external factors (such as an elastic force of a stopper 40 described below); and the like.

The external force F and acceleration A are detected by the various sensors 13 described above. For example, the external force F can be detected in a state where a load cell, pressure sensor, or the like is placed between a facing side of a holding portion of the cutting tool 20 and a facing side of an insertion hole of the head part 12, facing the axial direction Z of the cutting tool 20. The acceleration A can be detected in a state where an acceleration sensor or the like is placed in or near the head part 12.

The stopper 40 or the like that can move in the axial direction Z thereof may be externally mounted on the cutting tool 20. In this case, the stopper 40 may be configured to detect the tactile sense information by using the elasticity of the stopper 40. For example, a load cell, pressure sensor, or the like may be placed between the stopper 40 and the head part 12 to detect the external force F. To detect the acceleration A, an acceleration sensor or the like may be placed near the stopper 40.

The dental handpiece system may be configured to detect the tactile sense information continuously (preferably in real time). This allows the tactile sense information to be obtained as real-time information.

Since the dental handpiece system S1 detects the tactile sense information (external force F and acceleration A), the detected tactile sense information can be used.

For example, when the tactile sense information is detected, the display means 55 of the handpiece 10 may be configured to display a warning message with a mark that resembles a human face, text, light or the like, or it may be configured to report a sound message.

The dental handpiece system may be configured to adjust the rotational driving force of the electric motor 14 (cutting tool 20) according to the tactile sense information. For example, when the force F and/or the acceleration A acting in the direction of the handpiece 10 approaching the tooth 1 is/are detected, the rotational driving force of the cutting tool 20 is reduced. The cutting tool 20 may also be driven so as to rotate it in the opposite direction. In this case, the risk of biting or root apex penetration of the cutting tool 20 is reduced.

In this way, the dental handpiece system S1 that detects the tactile sense information can improve safety during the root canal treatment by using the tactile sense information. This allows even the low-skilled operators with a lower skill level to easily switch from a manual method for using hand cutting tools by a hand to a method for using the handpiece 10.

By continuing to use the dental handpiece system S1 that uses the tactile sense information that is actually transmitted to the operator's hand, even the low-skilled operator can relatively easily recognize a sensation in the hand at the moment when the cutting edge is slightly bitten into the root canal wall 2*a*, and a sensation and/or movement of the hand that pulls up the handpiece 10 at that moment (it is relatively easy to acquire a skilled pulling technique). On the other hand, it is possible for the high-skilled operators with a higher skill level for the root canal treatment than the low-skilled operators to maintain and further improve their skilled pulling technique. As a result, when the root canal treatment is performed using the dental handpiece system S1, the variation in the treatment effect between the low-skilled and high-skilled operators is reduced.

According to the dental handpiece system S1 configured as described above, the following effects can be obtained.

(1) The dental handpiece system S1 detects information related to the axial direction Z of the cutting tool 20 when cutting the root canal 2, instead of detecting information related to the rotation of the cutting tool 20 as in conventional handpieces and their systems. This information related to the axial direction Z of the cutting tool 20 (external force F and acceleration A) is something (tactile sense information) that can actually be felt by the operator. By continuing to use the dental handpiece system S1 using this tactile sense information, the skilled pulling technique can be acquired or maintained relatively easily. As a result, regardless of operator's skill level, the treatment can be performed more safely and the variation in the treatment effects can be reduced.

Second Embodiment

Figure 2:
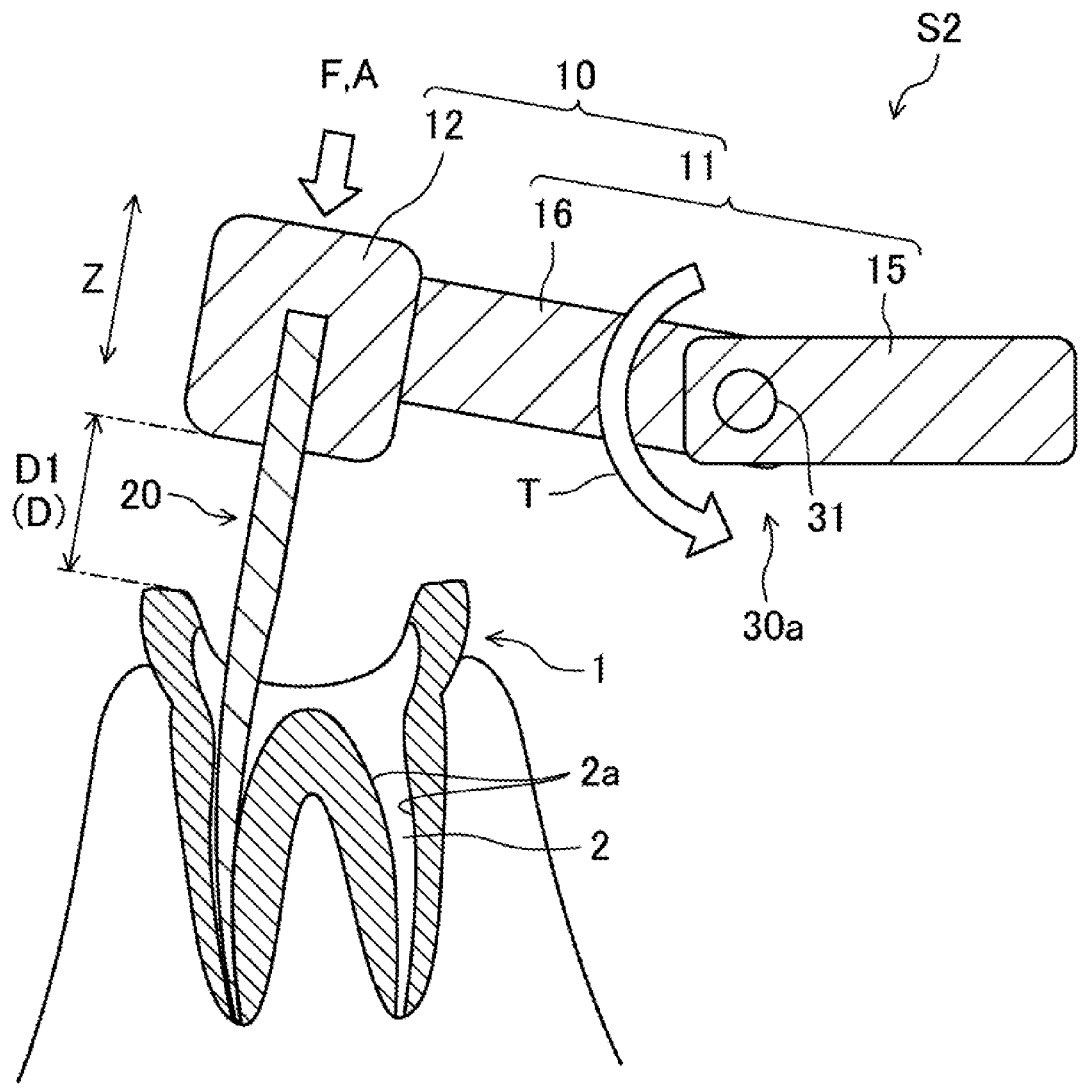
FIG. 2 shows a schematic cross-sectional view of a state where a root canal is cut using a dental handpiece system according to the second embodiment.
Figure 3:
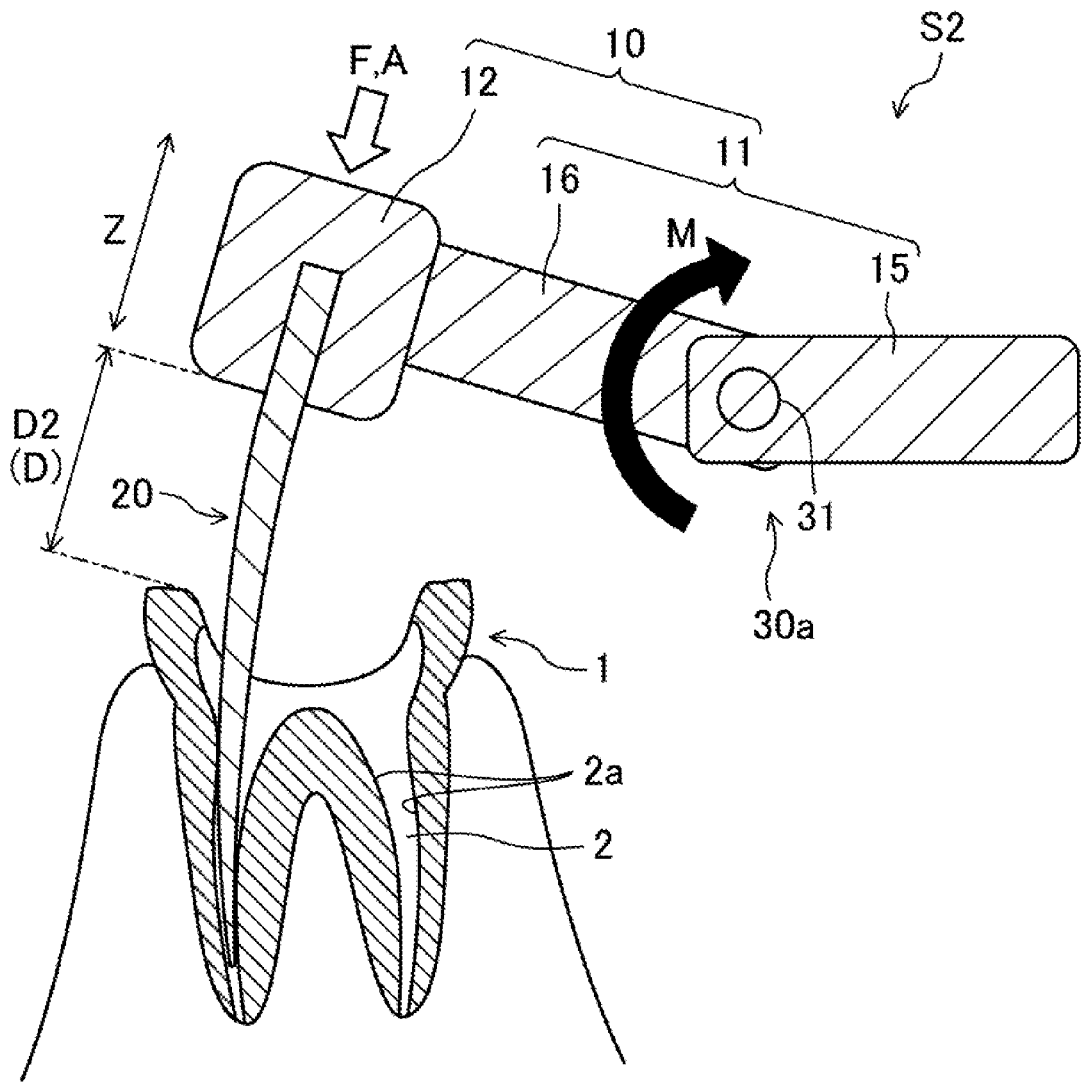
FIG. 3 shows a schematic cross-sectional view of a state where the handpiece shown in FIG. 2 is pulled away from the tooth.

FIGS. 2 and 3 show a dental handpiece system S2 according to the second embodiment of the present disclosure. In this embodiment, the configuration of the handpiece body 11 differs from that of the first embodiment described above. Also, the dental handpiece system S2 of this embodiment has further an adjustment mechanism 30a. Other aspects of the system are the same as those of the first embodiment, so detailed explanations for similar contents are not repeated here. In addition, the same sign is assigned to the common component parts between the first and second embodiments, and detailed explanations therefor are not repeated.

Handpiece Body

In this embodiment, the handpiece body 11 has a gripping portion 15 provided at its base end (opposite to the head part 12 side) and a neck portion 16 provided continuously between the gripping portion 15 and the head part 12. The gripping part 15 is a part grasped by the operator's fingers. The gripping portion 15 and the neck portion 16 are rotatably connected around a rotation (pivot) axis (hereinafter referred to as the "pivoting axis") 31 extending in a direction approximately perpendicular to the axial direction Z of the cutting tool 20 (in a direction perpendicular to the paper surface in FIGS. 2 and 3).

Adjustment Mechanism

The adjustment mechanism 30a is capable of adjusting the distance D between the handpiece 10 and the tooth 1 to be treated. Specifically, the adjustment mechanism 30a is configured so that the connected head part 12 and neck portion 16 can be rotated around the pivoting axis 31 with respect to the gripping portion 15. As a result, the distance D between the head part 12 of the handpiece 10 and the tooth 1 can be adjusted. In other words, the head part 12 can move back and forth (approximately up and down in FIGS. 2 and 3) in the direction of rotation of a circle drawn around the pivoting axis 31 (a circumferential direction near a contact point of a circle on a straight line along the axial direction Z of the cutting tool 20, or approximate axial direction Z of cutting tool 20) with respect to the tooth 1.

That is, the adjustment mechanism 30a can be said to a tilt-type adjustment mechanism (tilt mechanism) in which the head part 12 is configured to be movable in the approximate axial direction Z of the cutting tool 20 (pivotable around the pivoting axis 31). Since the adjustment mechanism 30a does not come into contact with the tooth 1 to be treated, it can be also said to a non-contact type adjustment mechanism.

Generally, the operator holding the handpiece stand ready to apply a force at any time in the direction opposite to a force F transmitted to the hand, depending on the direction of the force F. Then, when the handpiece 10 is lightly pulled in, the handpiece 10 is pulled up. More specifically, when the operator feels the force F and/or acceleration A in the hand in the direction of the handpiece 10 approaching the tooth 1, the operator performs the motion of pulling up the handpiece 10 (also known as pecking motion). The adjustment mechanism 30a adjusts the distance D between the handpiece 10 and the tooth 1 according to (by using) the detected tactile sense information of this pull-up motion of the handpiece 10 that the operator performs during the treatment. Thus, in the dental handpiece system S2, the adjustment mechanism 30a is configured to perform such motion instead of the operator's hand movement (to support the operator's hand movement).

The adjustment mechanism 30a is configured to detect the external force F. Specifically, the adjustment mechanism 30a allows the head part 12 to pivot around the pivoting axis 31, so that when the cutting tool 20 contacts (touches, presses) or bites into the root canal wall 2a, the force (external force) F received from the tooth 1 (external matter) can be detected by a torque T of the pivoting axis 31 through the cutting tool 20, head part 12 and neck part 16.

A method for detecting the external force F by the torque T of the pivoting axis 31 includes, for example, a method for installing a torque sensor on the pivoting axis 31 and detecting it, or a method for electrically connecting the pivoting axis 31 to a drive source such as an electric motor and actuator and detecting current, impedance or the like of the drive source. In the latter method, since a reaction force applied to the pivoting axis 31 is used, the adjustment mechanism 30a can be also said to an active stopper that acts in response to the reaction force. There is no need for a torque sensor and its sensor circuit in the method, resulting in simplifying the configuration of the dental handpiece system S2 and reducing its cost.

The head part 12 or neck portion 16 may have an acceleration sensor. As a result, the acceleration A can be detected by the acceleration of the head part 12 or neck part 16 rotating around the pivoting axis 31.

In the dental handpiece system S2, the adjustment mechanism 30a is configured to adjust the distance D between the head part 12 and the tooth 1 in accordance with (by using) the external force F detected as the torque T of the pivoting axis 31 and the acceleration A around the pivoting axis 31 (tactile sense information).

For example, as shown in FIG. 2, when a bite occurs during the cutting of the root canal 2, the adjustment mechanism 30a detects the external force F (and acceleration A) acting in the direction of the head part 12 approaching the tooth 1 as the torque T (and acceleration A) acting counterclockwise on the pivoting axis 31. The adjustment mechanism 30a then pulls the head part 12 away from the tooth 1 by moving the head part 12 and the neck 16 clockwise around the pivoting axis 31 as shown in FIG. 3 (arrow M shown in FIG. 3) based on the magnitude of the detected torque T (and acceleration A), the direction of rotation, and other information. In other words, the adjustment mechanism 30a can adjust the distance D between the head part 12 and the tooth 1 to be treated, from the distance D1 shown in FIG. 2 to the distance D2 shown in FIG. 3 so as to optimize the distance D (e.g., a distance that avoids the risk of biting or root apex penetration of the cutting tool 20, etc.). The range of distance D to be adjusted is, for example, 5 mm to 10 mm.

The structure of the adjustment mechanism 30a is not limited to any particular structure as long as it is configured as described above. The pivoting axis 31 of the adjustment mechanism 30a may employ a ratchet mechanism configured to restrict (regulate) the head part 12 from rotating counterclockwise around the pivoting axis 31 (moving the head part 12 in the direction of the head part 12 approaching the tooth 1).

The adjustment mechanism 30a may be configured so that the pivoting axis 31 can be driven by a drive source such as an electric motor or actuator. In this case, an adjustment mechanism drive circuit 56 (see FIG. 7) is provided in the handpiece body 11 or in the electronic device 50 in order to drive the adjustment mechanism 30a via the drive source.

This improves detection accuracy of the external force F and the response speed of the adjustment mechanism 30a because the torque T of the pivoting axis 31 can be electrically detected by the current, impedance or the like of the drive source.

The dental handpiece system S2 may employ the same configuration as the dental handpiece system S1 described above, and the same effect is obtained in such a case. Specifically, a stopper (such as stopper 40) movable in the axial direction Z of the cutting tool 20 may be externally mounted thereon. The adjustment mechanism 30a may be configured to continuously (preferably in real time) detect the torque T (and acceleration A) of the pivoting axis 31.

The dental handpiece system S2 may be configured to link the rotational driving force of the cutting tool 20 to the distance D between the head part 12 and the tooth 1. In this case, for example, when a torque T (see FIG. 2) acting counterclockwise around the pivoting axis 31 is detected (biting occurs), the adjustment mechanism 30a adjusts the distance D to pull the head part 12 away from the tooth 1 while or after decreasing the rotational driving force of the electric motor 14. Thereafter, when the biting is avoided and the cutting of the root canal 2 is resumed, the rotational driving force of the electric motor 14 is restored while or after moving the head part 12 closer to the tooth 1 by the adjusting mechanism 30a. As a result, the contact between the cutting tool 20 and the root canal 2 becomes gentle at the moment when the cutting tool 20 is brought into contact with the root canal wall 2a or at the moment when the cutting tool 20 is slightly bitten into the root canal wall 2a. As a result, the hand movements of the operator who performs the root canal treatment using the dental handpiece system S2 can be supported so as to being similar to those of the high-skilled operators.

According to the dental handpiece system S2 configured as described above, the following effects can be obtained in addition to the effects described in the above (1).

(2) The dental handpiece system S2 has further the adjustment mechanism 30a, and the adjustment mechanism 30a converts the external force F into the torque T of the pivoting axis 31 and detects it. According to (by using) the detected torque T, the distance D between the head part 12 of the handpiece 10 and the tooth 1 to be treated is adjusted by the adjustment mechanism 30a. By adjusting the distance D, the adjustment mechanism 30a can perform the pull-up motion of the handpiece 10 (support the operator's hand operation) instead of the operator's hand. As a result, even the low-skilled operator can safely perform the same treatment as the high-skilled operator by receiving such support. Therefore, regardless of the operator's skill level, the treatment can be performed even more safely and the variation in the treatment effects can be reduced.

(3) During the root canal treatment, the operator is required to repeat the motion of the cutting tool 20 biting slightly into the root canal wall 2a and being pulled up (push-pull motion). This places an unnecessary mental burden on the operator. Since the adjustment mechanism 30a supports the operator's hand operation, the burden on the operator can be reduced.

Third Embodiment

FIGS. 4 to 8 show the dental handpiece system S3 of the third embodiment of the present disclosure. In this embodiment, the configuration of an adjustment mechanism 30b differs from that of the adjustment mechanism 30a of the second embodiment described above. That is, the dental handpiece system S3 of this embodiment has the adjustment mechanism 30b instead of the adjustment mechanism 30a. In addition, the dental handpiece system S3 has further a stopper 40, a storage means 57, and a control means 58. Other aspects of the system are the same as those of the first and second embodiments described above, so detailed explanations for similar contents are not repeated here. In addition, the same sign is assigned to the common component parts between the third embodiment and the first and second embodiments, and detailed explanations therefor are not repeated.

Adjustment Mechanism

The adjustment mechanism 30b has an adjustment mechanism body 32 externally attached to the handpiece body 11, a contact part 33 to be contacted with the tooth 1 to be treated, and a connection part 34 that connects the adjustment mechanism body 32 and the contact part 33.

Figure 4:
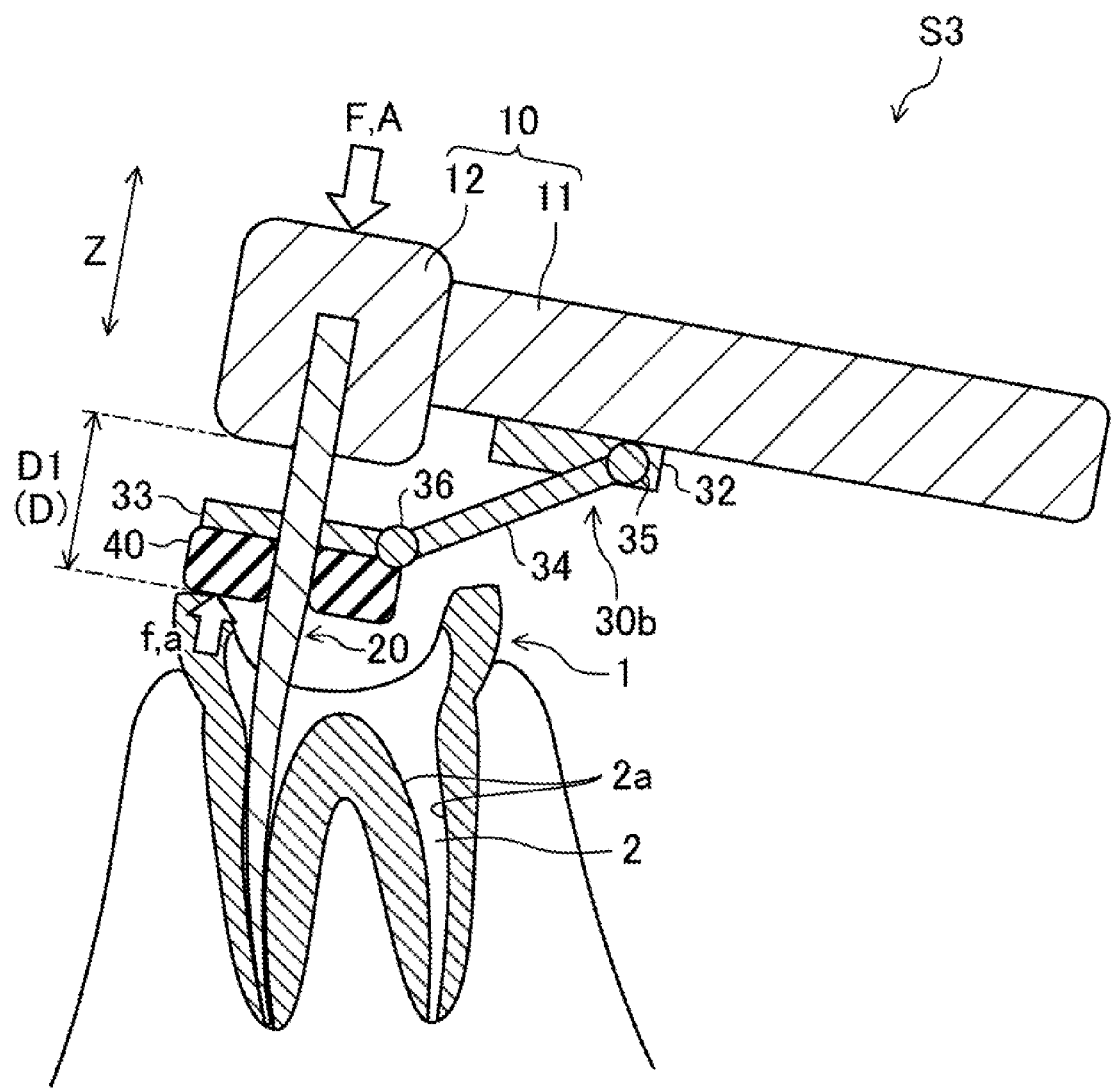
FIG. 4 shows a schematic cross-sectional view of a state where a root canal is cut using a dental handpiece system according to the third embodiment.
Figure 5:
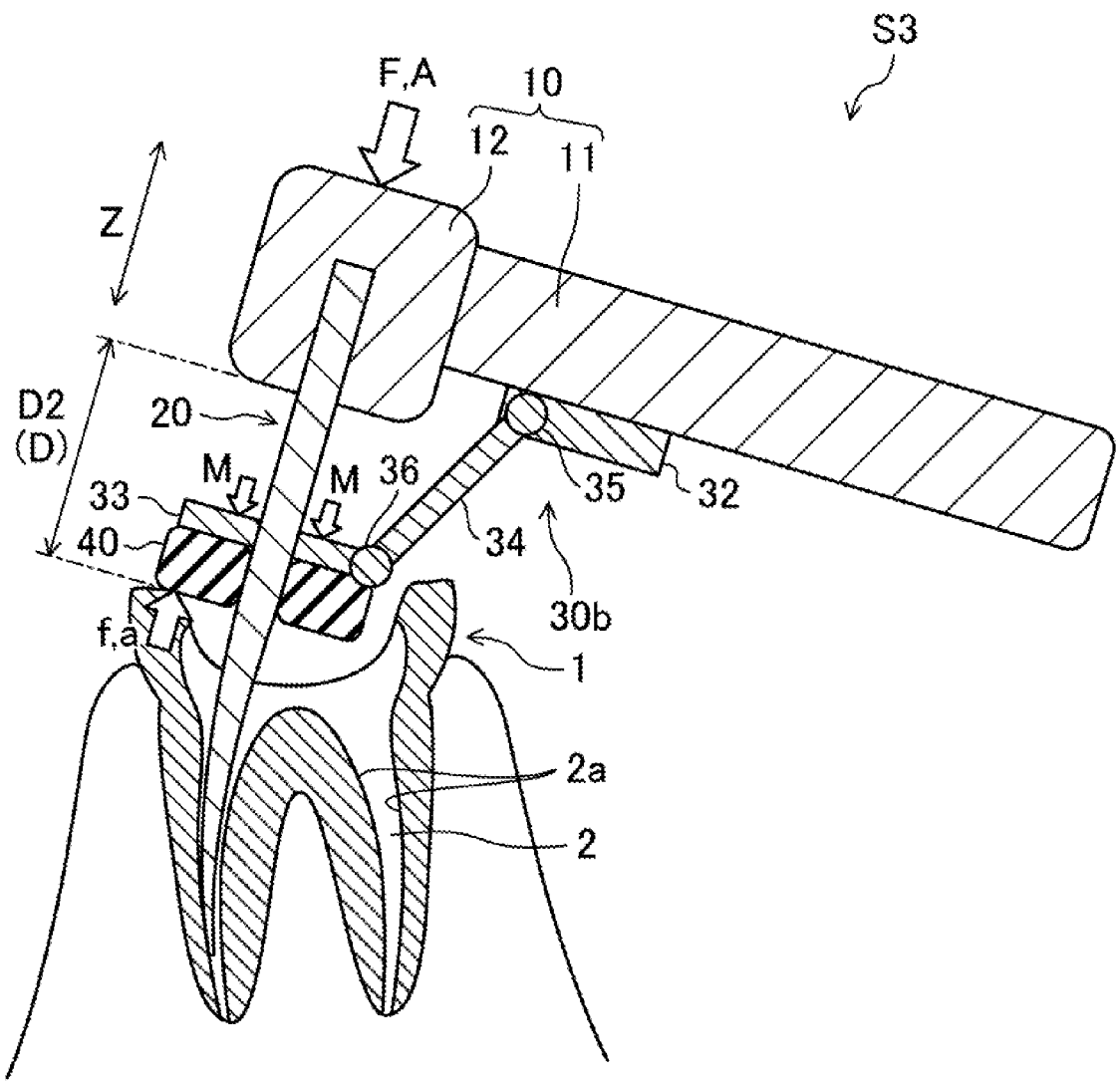
FIG. 5 shows a schematic cross-sectional view of a state where the handpiece shown in FIG. 4 is pulled away from the tooth.
Figure 6:
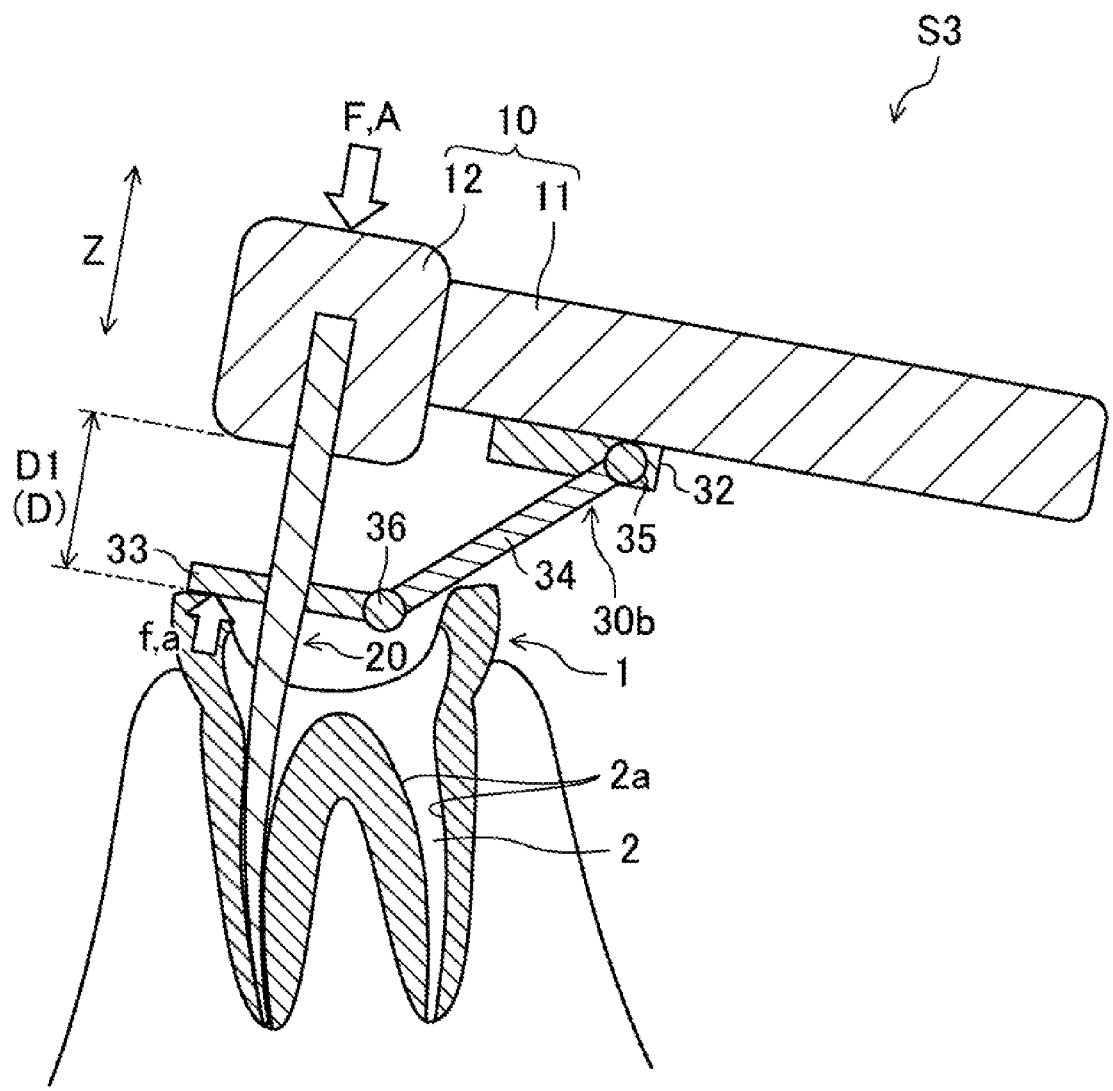
FIG. 6 shows a modified embodiment of the dental handpiece system according to the third embodiment which corresponds to FIG. 4.

The adjustment mechanism body 32 moves one end of the connection part 34 (rotation axis 35) back and forth in the longitudinal direction of the handpiece body 11 (in the approximate left-right direction in FIGS. 4 to 6). The adjustment mechanism body 32 is not limited to any particular mechanism, but can include, for example, an electric motor and an actuator. The adjustment mechanism body 32 is electrically connected to the adjustment mechanism drive circuit 56 for driving the adjustment mechanism body 32.

The contact part 33 (or at least a part thereof) is a part to be contacted with the tooth 1 to be treated when cutting the root canal 2. In other words, the adjustment mechanism 30b can be also said to a contact-type adjustment mechanism.

The contact part 33 has a through hole through which the cutting tool 20 can penetrate, and is externally mounted on the cutting tool 20 in a movable manner in the direction Z thereof. The contact part 33 is connected to the other end of the connection part 34 (rotation axis 36). The shape of the contact part 33 is not limited to any particular shape as long as it is capable of contacting with the tooth 1 to be treated when cutting the root canal 2, but can include, for example, a donut shape. The size, weight and the like of the contact part 33 is not limited to any particular size, weight and the like, respectively, as long as the adjustment mechanism body 32 is movable in the axial direction Z of the cutting tool 20 via the connection part 34. The contact part 33 may contact teeth other than the tooth 1 to be treated, or any other suitable part (bone or other hard part) in or outside the oral cavity, as long as the position of the contact part 33 can be stabilized when cutting the root canal 2.

The connection part 34 may have, for example, a long plate shape or rod shape, and has rotation (rotary) axes 35 and 36 extending in a direction perpendicular to the axial direction Z of the cutting tool 20 (in a direction perpendicular to the paper surface in FIGS. 4 to 6) at both ends of a longitudinal direction of the connection part 34. Through these rotational axes 35 and 36, the connection part 34, the adjustment mechanism body 32 and the contact part 33 are rotatably connected around the rotational axes 35 and 36. As a result, when one end of the connection part 34 moves back and forth in the longitudinal direction of the adjustment mechanism body 32 while rotating around the rotation axis 35, the other end of the connection part 34 rotates around the rotation axis 36, thereby changing inclination angle of the connection part 34 with respect to the axial direction Z of the cutting tool 20. As a result, the distance D between the head part 12 and the contact part 33 (i.e., the tooth 1 to be treated) can be changed.

The adjustment mechanism 30b is configured to detect the external force F in the same way as the adjustment mechanism 30a described above. Specifically, since at least a part of the contact part 33 is configured to contact with the tooth 1 to be treated during the root canal treatment, the adjustment mechanism 30b can detect the force f received from the tooth (external matter) at the contacting portion. For example, the force F received from the tooth 1 (external matter) when the cutting tool 20 contacts (touches, presses) or bites into the root canal wall 2a can be directly detected by the reaction force (pressure from the tooth) f applied to the contact part 33 from the tooth 1. In other words, the adjustment mechanism 30b can be also said to an active stopper that acts in response to the reaction force.

The method for detecting the external force F by the reaction force f applied to the contact part 33 includes, for example, a method for detecting it by installing a pressure sensor on a contacting surface of the contact part 33 with the tooth 1, and a method for detecting the drive current, impedance or the like of the adjustment mechanism body 32. There is no need for a pressure sensor and its sensor circuit in the latter method, resulting in simplifying the configuration of the dental handpiece system S3 and reducing its cost.

The acceleration sensor may be provided in the contact part 33 or its vicinity. As a result, the acceleration A can be detected directly by an acceleration a of the tooth 1 to be contacted with the contact part 33.

In the dental handpiece system S3, the adjustment mechanism 30b is configured to adjust the distance D between the head part 12 of the handpiece 10 and the tooth 1 to be treated, just like the dental handpiece system S2 described above, according to (by using) the external force f and acceleration a (tactile sense information) detected by the contact part 33.

For example, as shown in FIG. 4, when the biting occurs during the cutting of the root canal 2, the adjustment mechanism 30b detects the external force F (and acceleration A) acting in the direction of the head part 12 approaching the tooth 1 as the reaction force f (and acceleration a) applied to the contact part 33 from the tooth 1. The adjustment mechanism 30b then operates the adjustment mechanism body 32 to move one end of the connection part 34 (rotation axis 35) toward the head part 12, as shown in FIG. 5, based on information such as the magnitude and direction of the detected reaction force f (and acceleration a). As a result, the inclination angle of the connection part 34 with respect to the axial direction Z of the cutting tool 20 becomes smaller (the longitudinal direction of the connection part 34 approaches the axial direction Z of the cutting tool 20). As a result, the head part 12 is pulled away from the contact part 33 (i.e., the tooth 1) (arrow M shown in FIG. 5). In other words, the adjustment mechanism 30b can adjust the distance D between the head part 12 and the tooth 1 to be treated from the distance D1 shown in FIG. 4 to the distance D2 shown in FIG. 5 so as to achieve the optimum distance. The range of the distance D to be adjusted is, for example, 5 mm to 10 mm.

The structure of the adjustment mechanism 30b is not limited to any particular structure as long as it is configured as described above, and may include a structure using a jack, a structure using air pressure such as an airbag. In addition, since the adjustment mechanism 30b is provided outside the handpiece 10 (handpiece body 11), it may be configured so that it can be retrofitted to the handpiece 10.

The adjustment mechanism 30b may have the same configuration as the adjustment mechanism 30a described above, and the same effect is obtained in such a case. Specifically, the adjustment mechanism 30b may be configured to continuously (preferably in real time) detect the reaction force f (and acceleration a) applied to the contact part 33. It may also be configured to link the rotational driving force of the cutting tool 20 to the distance D between the head part 12 and the tooth 1 to be treated.

Stopper

Figure 7:
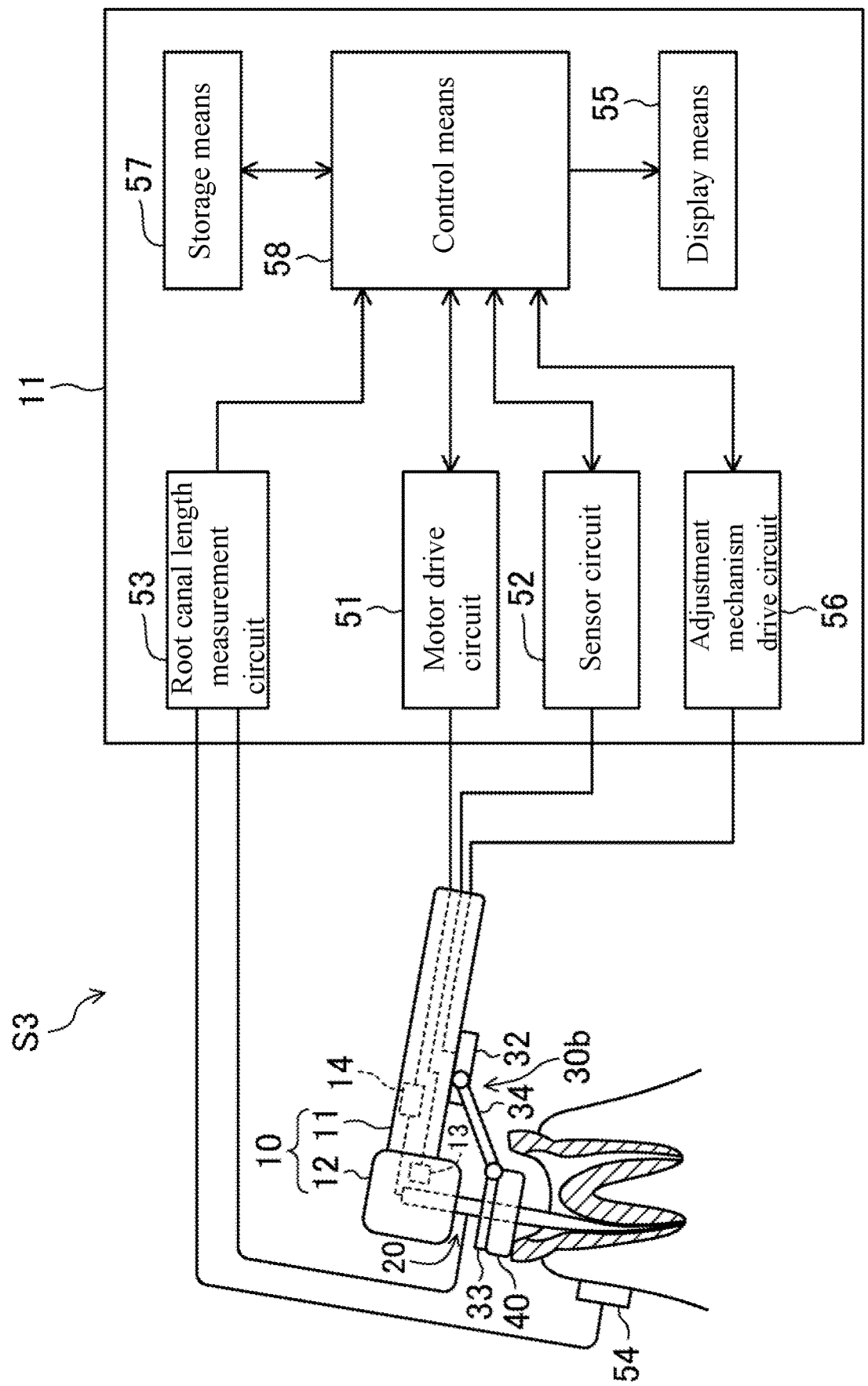
FIG. 7 shows a block diagram of the whole configuration of the dental handpiece system according to the third embodiment.

The dental handpiece system S3 may have further a stopper 40, as shown in FIGS. 4, 5 and 7. It is preferred that the stopper 40 is provided from the viewpoint of further supporting the movement of the operator's hand. The stopper 40 can also be employed in the dental handpiece systems S1 and S2 described above.

The stopper 40 has a through hole through which the cutting tool 20 can penetrate. The stopper 40 is externally mounted on the cutting tool 20 in a movable manner in the axial direction Z thereof, and is interposed between the tooth 1 to be treated and the contact part 33. Specifically, at least a part of the stopper 40 can contact with the tooth 1, while a surface on the opposite side of the surface to be contacted with the tooth 1 can contact with the contact part 33. In other words, at least a part of the adjustment mechanism 30b (contact part 33) can contact with the tooth 1 to be treated via the stopper 40. The adjustment mechanism 30b is configured to adjust the distance D between the handpiece 10 and the tooth 1 by moving the stopper 40 in the axial direction Z of the cutting tool 20.

The stopper 40 is composed of an elastic member that has elasticity, and the shape thereof naturally returns to its original shape by its own elasticity when the cutting tool is pulled. The elastic member is not limited to any particular material, but can include, for example, rubber, elastomer and resin. Commercially available products referred to as a rubber stopper or the like can be used as the stopper 40.

Specific examples of the stopper 40 include: a stopper attached to the cutting tool 20 (a commercially available product that is generally used as a guide for working length; length in the axial direction Z of the cutting tool 20: about 2 mm); a stopper whose length in the axial direction Z is adjusted specifically for the dental handpiece system S3 (including a type that is longer in the axial direction Z than the commercially available product and a type that has been cut to the optimum length before treatment); a stopper bonded and fixed to at least a part of the surface of the contact part 33 to be contacted with the tooth 1; a stopper that is a combination thereof.

The shape of the stopper 40 is not limited to any particular shape as long as it is capable of contacting the contact part 33 and the tooth 1 when cutting the root canal 2, but can have, for example, a donut shape. The stopper 40 can has any particular size, weight and the like as long as the adjustment mechanism body 32 can be moved in the axial direction Z of the cutting tool 20 via the contact part 33.

By interposing the stopper 40 between the tooth 1 and the contact part 33, the elasticity of the stopper 40 suppresses the pulling of the cutting tool 20 in the direction of the root apex, thereby reducing the risk of biting or root apex penetration of the cutting tool 20. As a result, anxiety about such a risk is reduced, and the usability and safety of the dental handpiece system S3 can be improved.

The dental handpiece system S3 may not have the stopper 40, as in the variant of this embodiment shown in FIG. G. In this case, the contact part 33 (at least a part thereof, the contacting portion) can directly contact with the tooth 1. Therefore, the contact part 33 itself may be composed of an elastic member. The elastic member can be the same as the one described above.

Storage Means

The dental handpiece system S3 has further a storage means 57 as shown in FIG. 7. The storage means 57 is provided in the handpiece body 11. The storage means 57 can also be employed in the dental handpiece systems S1 and S2 described above.

The storage means 57 prestores the optimal values of at least one of the external force F, the acceleration A, the distance D between the head part 12 and the tooth 1 to be treated, and the rotational driving force of the cutting tool 20 (hereinafter, at least one of the external force F, the acceleration A, the distance D, and the rotational driving force is collectively referred to as "information related to the movement of the handpiece 10") according to the desired movement of the handpiece 10 by the high-skilled operator.

The desired movement of the handpiece 10 by the high-skilled operator is the motion of the high-skilled operator's hand holding the handpiece 10, such as (I) stopping motion, (II) breaking motion, and (III) backing motion. The stop motion (I) refers to an action to stop the movement of the handpiece 10 in the axial direction Z of the cutting tool 20. The breaking motion (II) refers to an action to reduce the speed of the handpiece 10 toward the root apex in the direction approaching the tooth 1 or to suppress the advance itself when the cutting tool 20 bites into the root canal wall 2a and is pulled further and further toward the root apex. The backing motion (III) refer to an action to pull the handpiece 10 away from the tooth. The backing motion also includes a scraping motion to scrape out the nerve (cutting debris) and the like in the cut root canal 2. In addition to the above-mentioned motions (I) to (III), there are other motions such as a pushing motion which refer to an action to move the handpiece 10 forward by the operator, which are different from the forward movement by a propulsive force of the cutting tool 20.

When the high1-skilled operator feels the external force F and/or acceleration A acting on the handpiece 10 in the operator's hand, the operator moves the handpiece 10 in the desired manner to avoid the risk of biting or root apex penetration of the cutting tool 20, based on the combination of the above motions (I) to (III)

Regardless of the viewpoint of the above-mentioned risk-avoidance, the desired movement of the handpiece 10 may include a motion of the handpiece 10 suitable for recommended treatments which is based on the combination of the above-mentioned motions (I) to (III) with the above-mentioned scraping motion, the pushing motion of the handpiece 10 by the operator, a motion suitable for cases (including the shape of the root canal), a motion suitable for characteristics of the cutting tool 20 to be used.

In the dental handpiece system S3, when the high-skilled operator performs the above-mentioned motions (I) to (III) and other motions, the information related to the movement of the handpiece 10 is measured in advance, and the averaged values (optimal values) or the like are stored in the storage means 57.

That is, the desired movement of the handpiece 10 by the high-skilled operator is an optimal movement of the handpiece 10 during the root canal treatment that preserves or reproduces the movement of the high-skilled operator's hand (that is created based on the movement of the high-skilled operator's hand), and the information related to the movement of the handpiece 10 is information that quantifies the optimal movement of the handpiece 10 for each parameter.

The information relating to the movement of the handpiece 10 may be a series of continuous values corresponding to a series of movements of the handpiece 10. The information may be programmed, for example, for each case (including the shape of the root canal) and each type of cutting tool 20 to be used, and may be configured so that the operator can select the program.

The storage means 57 may be configured to sequentially store the information (latest information) related to the movement of the handpiece 10 detected continuously (preferably in real time) during actual treatment.

The storage means 57 may also be configured to prestore other information that can be used in combination with the information related to the movement of the handpiece 10.

For example, other information can include:

as information that is obtained before and during use of the handpiece 10,
- real-time information such as the load torque of the cutting tool 20 and the distance from the root apex position of tooth 1 to the tip of the cutting tool 20 measured by the root canal length measurement circuit 53, as available information during the use of the handpiece 10, and
- real-time information such as the rotational speed of the cutting tool 20, rotational mode (such as rotational direction, rotational speed and rotational angle);

as information to be pre-input into the handpiece,
- individual identification information of the cutting tool 20 [including product numbers, product sizes (specifically, cutting edge sizes as specified by ISO standards), corresponding standard colors, serial numbers, manufacturing dates, information attached to each lot or the like (such as identifiers used for medical devices called Unique Device Identification (UDI)) and information attached to each product (unique information such as an individual identification number that differs for each product)],
- information on specifications of the cutting tool 20 (recommended durability information provided by the manufacturers, such as cumulative load resistance and cumulative rotational speed resistance), and
- similar root canal shape information (2D image information of the tooth 1 (root canal 2) to be treated, 3D image such as X-ray CT image, ultrasound image and OCT image); and as information on the cutting tool 20 that is managed or updated after the use of the handpiece 10,
- information such as cumulative rotational speed (latest information), cumulative load torque (latest information), fatigue accumulation status calculated by comparing these pieces of latest cumulative information with the recommended durability information, and the root canal penetration speed of a file.

By using a combination of these pieces of information, a fracture risk and a risk of the root apex penetration of the cutting tool 20 can be further reduced because information appropriate to the cases (including the shape of the root canal) and the characteristics of the cutting tool 20 to be used can be used.

Control Means

As shown in FIG. 7, the dental handpiece system S3 has further a control means 58. The control means 58 is provided in the handpiece body 11. The control means 58 can also be employed in the dental handpiece systems S1 and S2 described above.

The control means 58 controls the adjustment mechanism 30b and the electric motor 14. That is, as shown in FIG. 7, the control means 58 is electrically connected to the adjustment mechanism drive circuit 56 that drives the adjustment mechanism 30*b* and the electric motor drive circuit 51 that drives the electric motor 14. This allows the adjustment mechanism 30*b* to be controlled independently, the electric motor 14 to be controlled independently, or the adjustment mechanism 30*b* and the electric motor 14 to be controlled jointly. This allows the rotational driving force of the cutting tool 20 to be linked to the distance D between the head part 12 and the tooth 1 to be treated. The control means 58 is also electrically connected to the sensor circuit 52, the root canal length measuring circuit 53 and the display means 55.

The control means 58 is also electrically connected to the storage means 57. As a result, the information related to the movement of the handpiece 10 prestored in the storage means 57 and, if necessary, other information are read out. Then, based on (by using) the information, the control means 58 controls the adjustment mechanism 30*b* and the electric motor 14 to adjust the distance D between the handpiece 10 and the tooth 1 to be treated and the rotational driving force of the cutting tool 20. In this way, in the dental handpiece system S3, the control means 58 optimizes at least one of the external force F, the acceleration A, the distance D, and the rotational driving force based on each piece of information stored in the storage means 57. In other words, the dental handpiece system S3 is configured so that the adjustment mechanism 30*b*, the electric motor 14, the storage means 57, and the control means 58 cooperate with each other to reproduce the movement of the high-skilled operator's hand (the desired movement of the handpiece 10).

For example, before and/or during the root canal treatment, the control means 58 reads the optimal value of the information related to the movement of the handpiece 10, latest information detected most recently (latest value), old information detected immediately before (old value), and the like from the storage means 57. The control means 58 then continuously (preferably in real time) controls the adjustment mechanism 30*b* and the electric motor 14 so that the latest value approaches the optimum value by comparing the optimum value with the latest value, or according to the change in the latest value and the old value by comparing the latest value with the old value. As a result, the adjustment mechanism 30*b* continuously (preferably in real time) adjusts the distance D between the head part 12 and the tooth 1 to be treated to an optimum distance such as a distance at which the root canal cutting by the propulsive force of the cutting tool 20 is possible and a distance at which the risk can be avoided. The electric motor 14 also continuously (preferably in real time) adjusts the rotational driving force of the cutting tool 20 to an optimum driving force.

By the series of controls, the operator who performs the root canal treatment using the dental handpiece system S3 is continuously (preferably in real time) supported so that the movement of the operator's hand is similar to that of the high-skilled operator's hand (pecking motion, push-pull motion, and pull-up motion). This makes it possible to automate the movements of the handpiece 10 to reproduce the movement of the high-skilled operator's hand. In this way, the dental handpiece system S3 performs the hand movements that the high-skilled operator performs during the root canal treatment. That is, the dental handpiece system S3 can be also said to a dental handpiece system that automates the movement of the handpiece 10 according to the real-time information related to the movement of the handpiece 10 stored in the storage means 57.

Electronic Device

Figure 8:
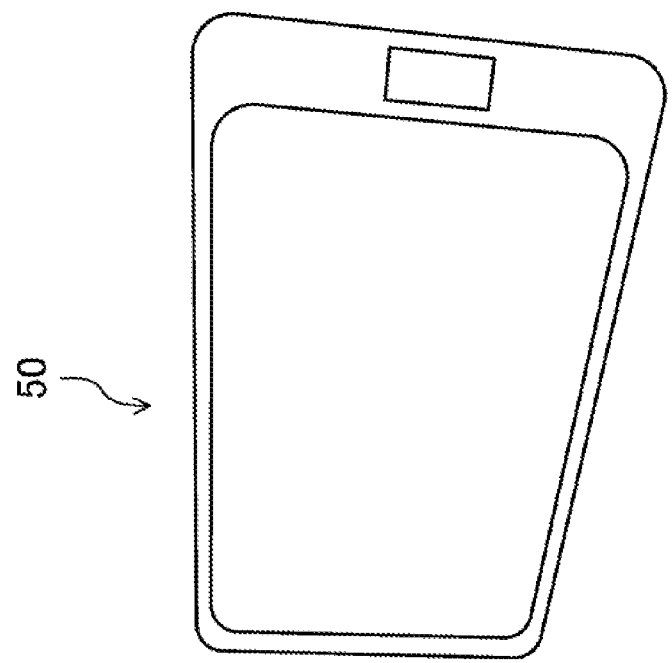
FIG. 8 shows a schematic diagram of the whole configuration of the dental handpiece system according to the third embodiment.
Figure 8:
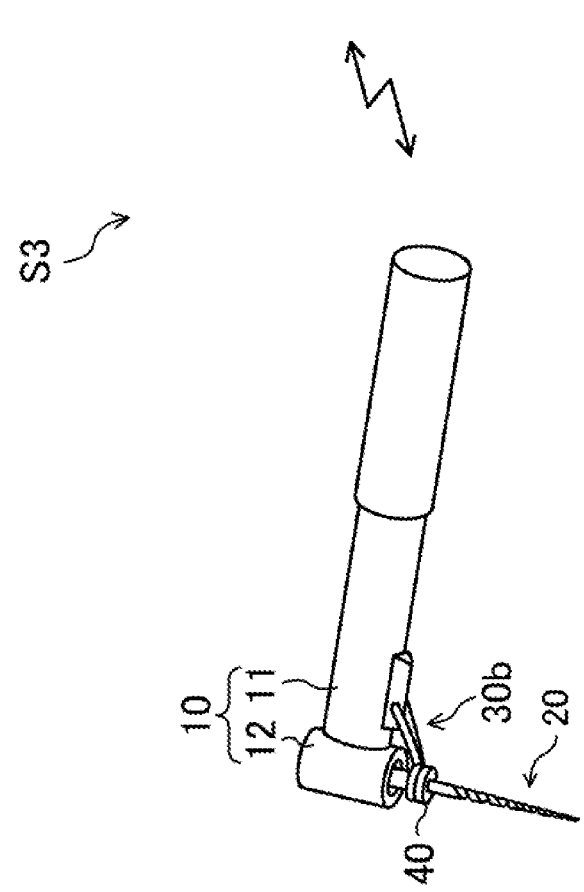

As shown in FIG. 8, in the dental handpiece system S3, the storage means 57 and the control means 58 may be provided in the electronic device 50 or the like. The electronic device 50 is configured to be able to send and receive various control signals and various pieces of information (data) described above from the handpiece 10 (adjustment mechanism 30*b*) via the Internet. The electronic device 50 is not limited to any particular device, but can include, for example, cell phones, tablet terminals, and personal computers. The electronic device 50 can also be employed in the dental handpiece systems S1 and S2 described above.

The electronic device 50 may also display information read out from the storage means 57, or display risk status of the cutting tool 20 during the treatment and current fatigue accumulation status of the cutting tool 20, for example, by means of numerical values or marks that resemble a human face. When the risk of biting, root apex penetration or the like of the cutting tool 20 increases during the root canal treatment, a warning sound may be sounded or the operation of the cutting tool 20 may be stopped.

In addition, the dental handpiece system S3 can use real haptics technologies. Specifically, a dental handpiece system S3*a*, which is located at an actual treatment location, and a dental handpiece system S3*b*, which is located at a remote location (operation location) different from the actual treatment location and is actually operated by the operator, are configured to send and receive various control signals and the various pieces of information (data) described above via the Internet. The systems are configured to transmit and receive various control signals and the information (data) via the Internet. By bi-directionally transmitting the tactile sense information (external force F and acceleration A) detected by the dental handpiece system S3*a*, the operator at the remote site can obtain and reproduce the tactile sense information that is almost the same as the tactile sense information in the dental handpiece system S3*b*. In other words, contact information can be shared between the dental handpiece systems S3*a* and S3*b*. Therefore, the dental handpiece system S3 can remotely treat the root canal 2.

According to the dental handpiece system S3 configured as described above, the following effects can be obtained in addition to the effects described in the above (1) to (3).

(4) The dental handpiece system S3 has the adjustment mechanism 30*b* which is different from the adjustment mechanism 30*a* described above, and directly detects the external force F as the reaction force f applied to the contact part 33 of the adjustment mechanism 30*b*. Therefore, the detection accuracy of the external force F and the response speed of the adjustment mechanism 30*b* can be improved. Therefore, regardless of the operator's skill level, the treatment can be performed more safely and the variation in the treatment effect can be reduced.

(5) The dental handpiece system S3 has further an elastic stopper 40, which is interposed between the tooth 1 and the adjustment mechanism 30*b* (contact part 33) in contact with the tooth 1. The stopper 40 supports the movement of the operator's hand, because the shape thereof naturally returns to its original shape by its own elasticity when the cutting tool is pulled. In addition, the risk of biting or root apex penetration of the cutting tool 20 is reduced, and the usability and safety of the dental handpiece system S3 can be improved.

(6) The dental handpiece system S3 has the storage means 57 and control means 58. The control means 58 controls the adjustment mechanism 30*b* and the electric motor 14 based on the information related to the movement of the handpiece 10 read out from the storage means 57. This makes it possible for anyone to reproduce the movement of the high-skilled operator's hand. That is, even the low-skilled operator can perform safe treatment. In other words, the dental handpiece system S3 can be also said to a dental handpiece system that does not require skilled techniques. In addition, by continuously supporting the movement of the high-skilled operator's hand, it is possible to automate the movements of the handpiece 10 to reproduce the movements. Furthermore, by using the real haptics technologies, even remote operators can perform safe treatment and reduce the variability in the treatment effects, regardless of their skill level.

Fourth Embodiment

Figure 9:
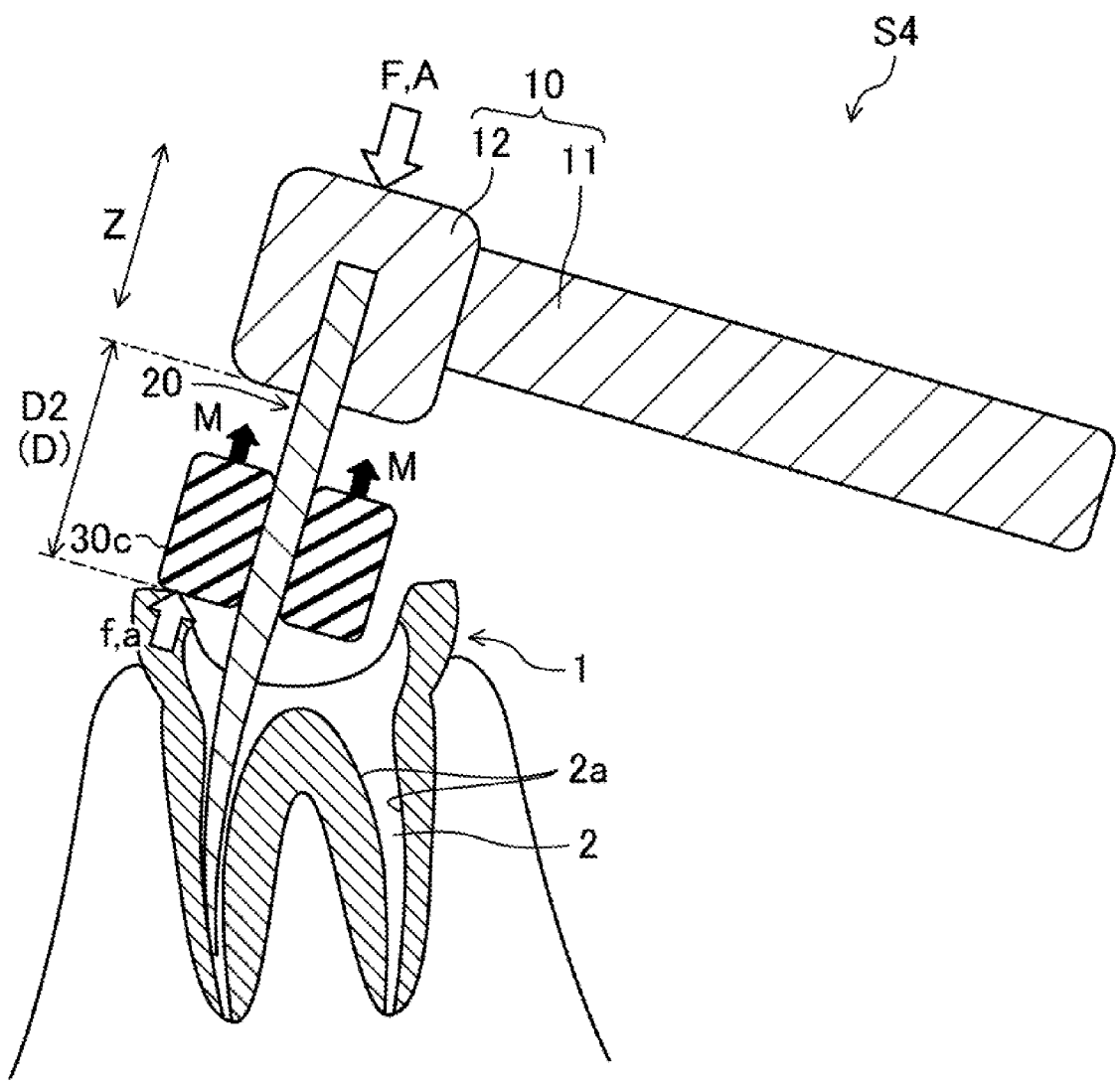
FIG. 9 shows a schematic cross-sectional view of a state where a root canal is cut using a dental handpiece system according to the fourth embodiment.
Figure 10:
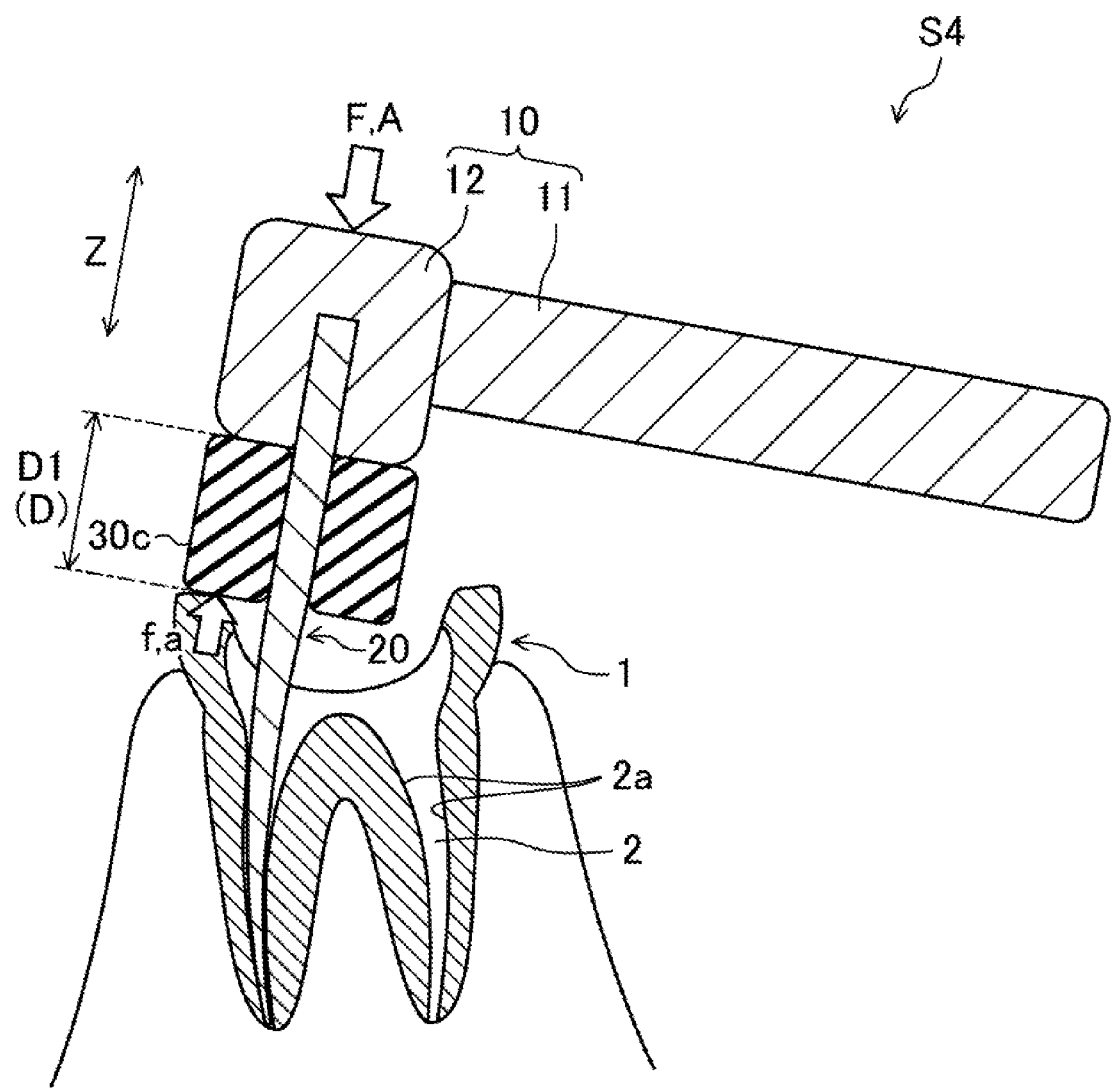
FIG. 10 shows a schematic cross-sectional view of a state where a tip of the cutting tool shown in FIG. 9 is close to a root apex of the root canal.

FIGS. 9 and 10 show a dental handpiece system S4 of the fourth embodiment of the present disclosure. In this embodiment, the configuration of an adjustment mechanism 30c differs from the adjustment mechanisms 30a and 30b of the second and third embodiments described above. That is, the dental handpiece system S4 of this embodiment has the adjustment mechanism 30c instead of the adjustment mechanisms 30a and 30b. Other aspects of the system are the same as those of the first to third embodiments described above, so detailed explanations for similar contents are not repeated here. In addition, the same sign is assigned to the common component parts between the fourth embodiment and the first and third embodiments, and detailed explanations therefor are not repeated.

Adjustment Mechanism

The adjustment mechanism 30c has an identical or similar shape to an elastic member identical to the stopper 40, and is disposed between the tooth 1 to be treated and the head part 12 of the handpiece 10. Specifically, the adjustment mechanism 30c has a through hole through which the cutting tool 20 can penetrate, is externally mounted on the cutting tool 20 so as to be movable in the axial direction Z thereof, and is interposed between the head part 12 of the handpiece 10 and the tooth 1 to be treated. A commercial product referred to as a rubber stopper or the like as described above and an elastic member for a rubber stopper before it is suitably cut short can be used as the adjustment mechanism 30c.

In the adjustment mechanism 30c, the length of the axial direction Z of the cutting tool 20 thereof is longer than that of a rubber stopper generally used as a guide for the working length, and may has been adjusted to an optimum length according to the type of cutting tool 20 to be used, image information taken in advance of the tooth 1 (root canal 2) to be treated, and the like. From the viewpoint of reducing the risk of the root apex penetration, the optimum length refers to, for example, a length that is approximately the same as the length obtained by subtracting the root canal length of the root canal 2 to be treated from the length of the cutting tool 20 in the axial direction Z (of the cutting tool 20 protruding from the surface of the head part 12) excluding the holding portion. For example, the adjustment mechanism 30c can be obtained by a method for cutting the elastic member for the rubber stopper to an optimum length (separating the elastic member for the rubber stopper into a plurality of parts) or a method for using a plurality of commercial products referred to as rubber stoppers or the like as described above and connecting a plurality of such commercial products in the axial direction Z. In other words, the adjustment mechanism 30c can be also said to a rubber stopper adjusted to the optimum length. In addition, the adjustment mechanism 30c can be also said to a stopper member that enables adjustment of the length of the cutting tool 20 in the axial direction Z for placement between the tooth 1 to be treated and the head part 12.

Examples of the stopper 40 include:
- a stacked stopper body in which the stoppers to be attached to the cutting tool 20 (commercially available products that are generally used as a guide for the working length; length of the cutting tool 20 in the direction axial Z: about 2 mm) are connected in the axial direction Z according to the optimum length;
- a stopper whose length in the direction axial Z has been adjusted specifically for the dental handpiece system S3 (including the type that is longer in the axial Z direction than commercially available products and the type that is cut before treatment);
- a stopper bonded and fixed to at least a part of the surface of the contact part 33 to be contacted with the tooth 1; and
- a stopper that is a combination thereof.

At least a part of the adjustment mechanism 30c is configured to contact with the tooth 1. In other words, the adjustment mechanism 30c can be also said to be a contact type adjustment mechanism, just like the adjustment mechanism 30b described above. As a result, the adjustment mechanism 30c can detect the force f received from the tooth (external matter) at the contacting portion of the adjustment mechanism 30c, just like the adjustment mechanism 30b (contact part 33). In other words, the adjustment mechanism 30c can be also said to an active stopper that acts in response to the reaction force. The same method for detecting the reaction force f can be used as in the adjustment mechanism 30b. The adjustment mechanism 30c or its vicinity may have the acceleration sensor.

In the dental handpiece system S4, the adjustment mechanism 30c adjusts the distance D between the head part 12 of the handpiece 10 and the tooth 1 to be treated, just like the dental handpiece systems S1 and S2 described above, according to (by using) the external force f and acceleration a (tactile sense information) detected by the adjustment mechanism 30c. The system is configured to adjust the distance D between the head part 12 of the handpiece 10 and the tooth 1 to be treated.

For example, the adjustment mechanism 30c, which has been cut in advance to the optimum length, is externally mounted on the cutting tool 20 so that it can be moved in the axial direction Z thereof. Then, as shown in FIG. 9, the root canal treatment is performed with at least a part of the adjustment mechanism 30c in contact with the tooth 1 to be treated while a gap is provided between the adjustment mechanism 30c and the head part 12 of the handpiece 10. During the root canal treatment, the adjustment mechanism 30c moves in the direction of the arrow M shown in FIG. 9 when the contacting part thereof detects the reaction force f (and acceleration a) received from the tooth 1. At this time, the adjustment mechanism 30c moves relatively slowly (gradually) because its contact area with the cutting tool 20 is larger than that of commonly used rubber stoppers, and its resistance to the cutting tool 20 is greater than that of the commonly used rubber stoppers. In other words, rapid movement of the adjustment mechanism 30c in the direction of the arrow M is suppressed, and as a result, the cutting tool 20 is prevented from biting into the root canal wall 2a and being rapidly pulled toward the root apex.

Furthermore, as shown in FIG. 10, the adjustment mechanism 30c is adjusted to the optimum length. Thus, when the tip of the cutting tool 20 approaches the root apex of the root canal 2, the adjustment mechanism 30c contacts the head part 12. This prevents the adjustment mechanism 30c from moving in the direction of the arrow M. As a result, the risk of root canal penetration is reduced even if the root canal length measurement circuit 53 is not provided.

In this way, the adjustment mechanism 30c can adjust the distance D between the head part 12 and the tooth 1 to be treated from the distance D2 shown in FIG. 9 to the distance D1 shown in FIG. 10.

According to the dental handpiece system S4 configured as described above, the following effects can be obtained in addition to the effects described in the above (1) to (3).

(7) The dental handpiece system S4 has the adjustment mechanism 30c which is different from the adjustment mechanisms 30a and 30b described above. As with the adjustment mechanism 30b, the external force F is directly detected as the reaction force f applied to the contacting portion of the adjustment mechanism 30c to be contacted with the tooth 1. Therefore, the detection accuracy of the external force F and the response speed of the adjustment mechanism 30c can be improved. Therefore, regardless of the operator's skill level, the treatment can be performed even more safely and the variation in the treatment effect can be reduced.

(8) In the dental handpiece system S4, the adjustment mechanism 30c is at least one stopper member whose length in the axial direction Z of the cutting tool 20 can be adjusted in its arrangement. The length of the stopper member can be easily adjusted to the optimum length by cutting (separating) the stopper member or connecting the stopper members to each other. This allows the structure and configuration of the adjustment mechanism 30c to be simple.

(9) In the dental handpiece system S4, the movement of the operator's hand is supported because the shape of the adjustment mechanism 30c naturally returns to its original shape by its own elasticity when the cutting tool is pulled. Also, the sudden movement of the adjustment mechanism 30c in the direction of the arrow M is suppressed during the root canal treatment, which reduces the risk of biting or root apex penetration of the cutting tool 20, and improves the usability and safety of the dental handpiece system S4.

Stopper Member

The stopper member of the present disclosure has the same configuration as that of the adjustment mechanism 30c, and is made based on the same elastic member, method, and shape as those of the adjustment mechanism 30c. The stopper member can be suitably used in a dental handpiece system that has a handpiece 10 having a handpiece body 11 and a head part 12, and a cutting tool 20 (i.e., having the same configuration as the dental handpiece systems S1 to S4 described above), and is placed between the tooth 1 to be treated and the head part 12. The length of the cutting tool 20 in the axial direction Z can be adjusted by placing a stopper member, and the length of the stopper member has been adjusted to the optimum length.

The stopper member configured in this way acts as an active stopper when placed in any of the dental handpiece systems S1 to S4 described above, while it acts as a fully passive stopper when placed in a dental handpiece system that is not configured to detect the external force F and/or acceleration A.

When the stopper member acts as the fully passive stopper, movement thereof is the same as that of the adjustment mechanism 30c. In FIGS. 9 and 10, the adjustment mechanism 30c will be referred to as the stopper member. For example, the stopper member cut in advance to the optimum length is externally mounted on the cutting tool 20 so that it can be moved in the axial direction Z thereof. Then, as shown in FIG. 9, the root canal treatment is performed with at least a part of the stopper member contacted with the tooth 1 to be treated while a gap is provided between the stopper member and the head part 12 of the handpiece 10. During the root canal treatment, the stopper member moves in the direction of the arrow M shown in FIG. 9 when its contacting part receives a reaction force f from the tooth 1. At this time, the stopper member moves relatively slowly (gradually) because its contact area with the cutting tool 20 is larger than that of commonly used rubber stoppers, and its resistance to the cutting tool 20 is greater than that of the commonly used rubber stoppers. In other words, the rapid movement of the stopper member in the direction of the arrow M is suppressed, and as a result, the cutting tool 20 is prevented from biting into the root canal wall 2a and being rapidly pulled toward the root apex.

Furthermore, as shown in FIG. 10, the stopper member adjusted to the optimum length contacts the head part 12 when the tip of the cutting tool 20 approaches the root apex of the root canal 2. The movement of the stopper member in the direction of the arrow M is restricted by such a configuration of the stopper member. As a result, the risk of root canal penetration is reduced even if the root canal length measurement circuit 53 is not provided.

According to the stopper member configured as described above, the same effects as the above (8) and (9) can be obtained.

Other Embodiments

The first to fourth embodiments are configured to detect both the external force F and the acceleration A when cutting the root canal 2, but is not limited thereto. For example, these embodiments may be configured to detect at least one of the external force F and the acceleration A. By detecting both external force F and acceleration A, the detection accuracy of tactile sense information can be improved. On the other hand, when only the external force F is detected, the acceleration sensor and its sensor circuit for detecting the acceleration A are unnecessary. As a result, the configuration of the dental handpiece system S1, S2 and S3 can be made simpler, reducing the manufacturing cost.

In the third embodiment, the control means 58 is configured to control both the adjustment mechanism 30B and the electric motor 14, but is not limited thereto. For example, the control means 58 may be configured to control at least one of the adjustment mechanism 30B and the electric motor 14.

In the third embodiment, the adjustment mechanism 30b (the adjustment mechanism body 32) is configured to be electrically controlled by the control means 58, but is not limited thereto. For example, the adjustment mechanism 30b may be configured as a spring, a stretch spring, or the like that elastically pulls the handpiece 10 away from the tooth 1 (contact part 33).

INDUSTRIAL APPLICABILITY

The present disclosure is applicable to handpieces used to treat the root canals of the tooth.

DESCRIPTION OF THE REFERENCE NUMERAL

S1, S2, S3, S4 Dental handpiece system
Z Axial direction of a cutting tool
F, f Force applied to a handpiece from an external matter in an axial direction of a cutting tool A, a Acceleration of a handpiece in an axial direction of a cutting tool
D1, D2 (D) Distance between a handpiece and a tooth to be treated
M Movement of an adjustment mechanism
T Adjustment mechanism torque
1 Tooth to be treated
2 Root canal
2a Root canal wall
10 Handpiece
11 Handpiece body
12 Head part
13 Sensor
14 Electric motor (imparting means)
15 Gripping portion
16 Neck portion
20 Cutting tool
30a, 30b, 30c Adjustment mechanism
31 Rotation axis
32 Adjustment mechanism body
33 Contact part
34 Connection part
35, 36 Rotation axis of connection part
50 Electronic device
51 Motor drive circuit
52 Sensor circuit
53 Root canal length measurement circuit
54 Oral electrode
55 Display means
56 Adjustment mechanism drive circuit
57 Storage means
58 Control means

What is claimed is:

1. A dental handpiece system comprising a handpiece and a rod-shaped cutting tool,
wherein the handpiece comprises a handpiece body and a head part provided at a tip of the handpiece body,
the rod-shaped cutting tool is rotatably attached to the head part of the handpiece and is used to cut a root canal of a tooth,
the handpiece body comprises: a gripping portion provided at a base end of the handpiece body; a neck portion provided continuously between the gripping portion and the head part; a pivoting axis; and an adjustment mechanism,
the gripping portion is connected to the neck portion via the pivoting axis,
the neck portion is rotatable around the pivoting axis with respect to the gripping portion,
the dental handpiece system detects a force applied to the handpiece from an external matter in an axial direction of the cutting tool, an acceleration of the handpiece in the axial direction of the cutting tool when cutting the root canal, or both;
wherein the adjustment mechanism is configured to rotate the head part and neck portion around the pivoting axis with respect to the gripping portion to adjust the distance between the head part and the tooth to be treated according to the detected force applied to the handpiece, the acceleration of the handpiece, or both.

2. The dental handpiece system of claim 1, wherein the adjustment mechanism detects the force applied to the handpiece from the external matter.

3. The dental handpiece system of claim 1, further comprising an imparting means for imparting a rotational driving force to the cutting tool,
wherein the rotational drive force is adjusted according to at least one selected from the group consisting of the force applied to the handpiece from the external matter and the acceleration of the handpiece, when cutting the root canal.

4. The dental handpiece system of claim 3, wherein the rotational driving force is linked to the distance between the handpiece and the tooth to be treated.

5. The dental handpiece system of claim 3, further comprising a storage means and a control means for controlling at least one of the adjustment mechanism and the imparting means,
wherein the storage means prestores one or more optimal values of at least one selected from the group consisting of the force applied to the handpiece from the external matter, the acceleration of the handpiece, the distance between the handpiece and the tooth to be treated, and the rotational driving force, and
the control means continuously controls at least one of the adjustment mechanism and the imparting means so that at least one selected from the group consisting of the force applied to the handpiece from the external matter, the acceleration of the handpiece, the distance between the handpiece and the tooth to be treated, and the rotational driving force is optimized based on the one or more optimum values read from the storage means, to support the movement of the handpiece.

* * * * *